SAMUEL NATELSON
INVENTOR.

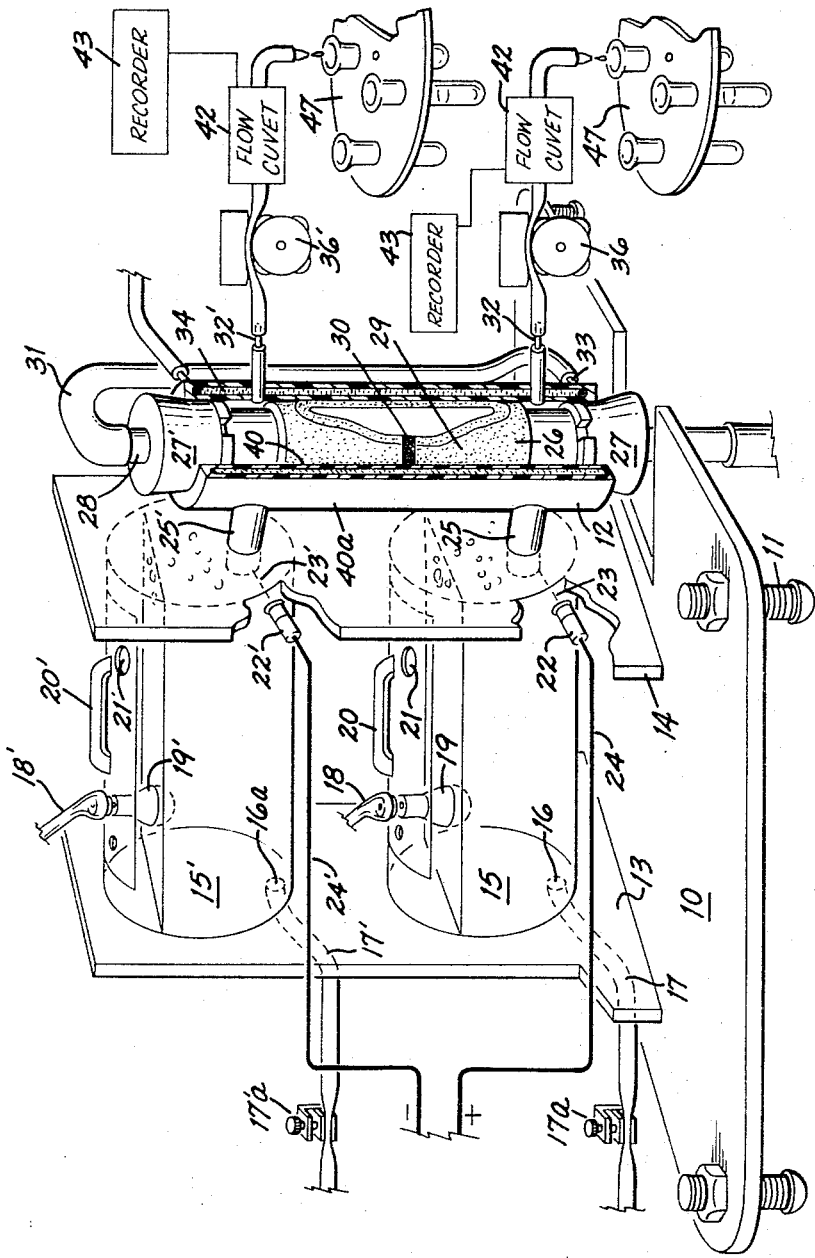

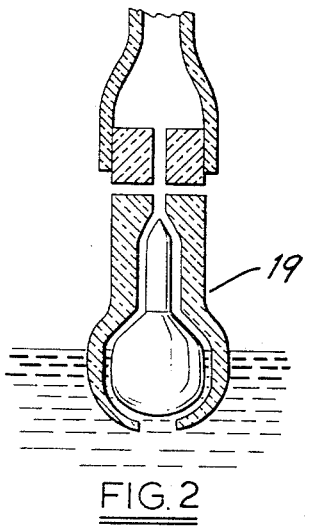
FIG. 2
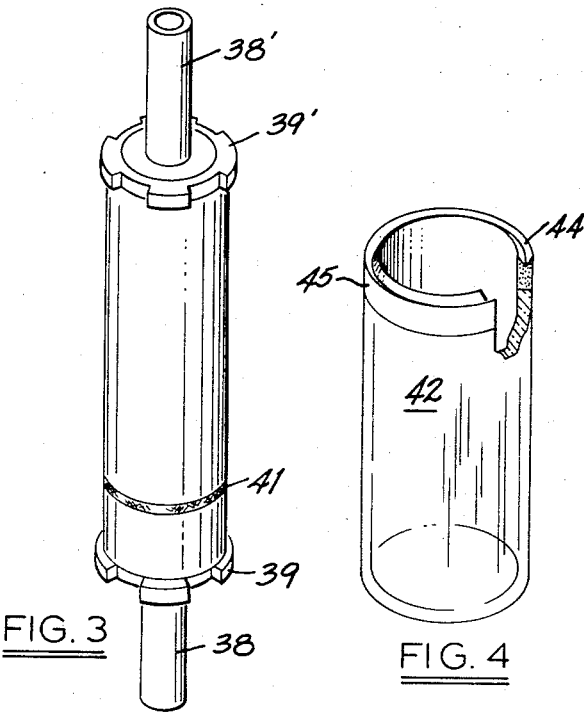
FIG. 3
FIG. 4
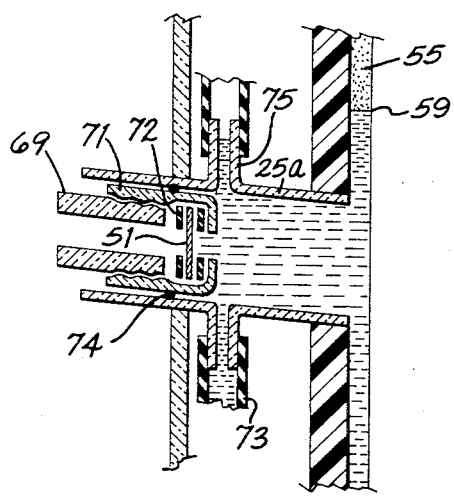
FIG. 6

ATTORNEY

United States Patent Office 3,346,479
Patented Oct. 10, 1967

3,346,479
PREPARATIVE SEPARATION BY A COMBINATION OF GEL SEPARATION AND ELECTROPHORESIS
Samuel Natelson, Valley Stream, N.Y., assignor to Scientific Industries, Inc., Queens Village, N.Y.
Filed Apr. 9, 1964, Ser. No. 358,539
12 Claims. (Cl. 204—301)

The present invention relates to the separation of particles by a combination of gel filtration and electrophoresis, and more particularly to an instrument for automatically carrying out this separation.

If a gel is suspended in a tube and a colloidal sol of particles of molecular weight of the order of 1000 or more, such as polypeptides, polysaccharides or a protein is added at the top of the tube, the sol will move through the gel and emerge at the bottom of the tube. During the process, the particles in the sol will separate and emerge at different rates in accordance with their molecular size. The order in which they emerge will depend upon the size of the spaces between particles in the gel, and the nature of the gel. Thus in some gels proteins will emerge ahead of low molecular weight salts. This occurs because some gels act as a conglomeration of individual highly hydrated macromolecules, called micelles. The salt diffuse into the micelles and are then washed out by the water. The proteins being of high molecular weight merely move right through, thus getting ahead of the salts. Generally if two or more proteins or polypeptides are present the smaller one will emerge first, moving rapidly between the micelles.

The technique of separation of particles by passing then through a gel is called gel filtration. Generally, separation by gel filtration alone is not effective where two or more polypeptides of similar molecular weights are present in the mixture.

With electrophoresis, particles are separated by differences in mobility in an electrical field. This can be done with or without a supporting medium.

An example of preparative separation by electrophoresis without a supporting medium is the use of a gradient tube. In this case a concentrated solution of sucrose in a conducting buffer is placed in a tube. This is followed by layers of a series of solutions of the same buffer containing less and less of the sucrose. Thus, if the tube is not disturbed or agitated, the heaviest solution will remain at the bottom while the lighest solution stays at the top. If a sample containing the mixture of polypeptides is now suspended at the top, and an electrical current is passed through, and a buffer is chosen so as to make all of the polypeptides move in the same direction, the fastest moving component will eventually reach the bottom first. If the solution at the bottom is constantly removed, and replaced by fresh buffer containing the strong sucrose solution, the polypeptides will emerge in sequence in accordance with their mobilities. They may be fed to a turntable containing a series of test tubes which may thus carry off the successive samples of protein. Two proteins, of different molecular weight, may have the same mobility if the heavier one is more highly charged. Thus this system does not afford clean cut separations. This technique is discussed by Ed. P. Alexander et al., "A Laboratory Manual of Protein Chemistry Including Polypeptides," Pergamon Press Ltd., London, 1960.

Preparative electrophoresis may be carried out by using a supporting medium such as powdered cellulose. In this case the tube is filled with cellulose powder at the top of which the sample is added. When the current is started the proteins or polypeptides will move at different rates through the powdered cellulose and emerge at the bottom as before, being washed away continuously by fresh buffer so as to collect the fractions in different test tubes. This process is slower than wtihout the supporting medium and usually takes 25–40 hours for completion. Again, separations are not complete for the same reason as with electrophoresis with a gradient tube. An example of this technique is described by J. Porath et al. "Nature," vol. 182, p. 744, 1958.

By carrying out the electrophoresis in a gel one takes advantages of a combination of gel filtration and electrophoresis. Thus separations can be carried out by this combination which cannot be carried out by either method above. The size of the space between micelles in the gel may be varied the concentration of the gel. Separations have been carried out by electrophoresis on gels such as agar gel, starch gel, and acrylamide gel by electrophoresis. But in each case after the electrophoresis is carried out, the gels are stained to indicate the location of the fractions and by sectioning the gel and eluting the sections some degree of separation and isolation of fractions may be obtained. But, this is impractical for reasonably large amounts of material. A practical instrument for separations of the fractions and then isolating them individually in reasonably large quantities has not been available up to the present time. Thus, gels have been used mainly for analytical purposes but not for preparative purposes.

The object of the present invention is to provide an instrument capable of sorting particles both by charge and size and collecting them individually so that the individual fractions may be isolated in any required amounts with a high degree of purity.

To accomplish the desired objective, certain problems have to be solved, the gel has to be of uniform thickness throughout. The gel has to be thin so that it can be cooled on both sides. This is necessary since relatively high voltages and currents are used over a short length generating a relatively high wattage. This has to be efficiently dissipated in order to maintain a constant temperature. The gel has to be maintained in an accurately vertical position so that the fraction emerges evenly. Since the particular buffers used have a high resistance, very short electrical leads have to be used, so that unnecessarily high voltage at the source are not necessary to maintain necessary voltage on the gel. The liquid level of the buffer must be maintained constant, relative to the level of the gel so that the flow of liquid is constant to obtain reproducible results. Means must be provided to eliminate "edge effects" since the mobility at the edges of a gel is different than that at the center. All of the particular fractions desired have to leave the gel at the same time so that overlapping does not occur. Thus, when a flat gel is used, say of six inches in width it is difficult to maintain the fraction moving parallel to the edge of the gel. One side comes off before the other, resulting in mixing of fraction (S. Raymond, Clinical Chemistry, vol. 8, page 455, 1962). The gel has to be so suspended that fractions can be removed at the both ends, since some polypeptides move in the direction of the anode and others in the direction of the cathode. Convenient means for rapid assembling of the instrument and cleaning between runs have also to be provided. In addition, the products of electrolysis have to be kept separate from the eluted proteins so as not to contaminate them and the elution of the separated proteins have to be rapid and complete so as not to leave residues of one fraction in the gel which contaminate the next fraction. Since the gel may contract slightly during the process and then slide down, means must be arranged so that the gel remains suspended vertically with no slippage. Air bubbles at the interface of the gel and the conducting buffer will interfere with the current flow. Means have to be provided to avoid this and readily remove air bubbles if formed. The instrument should be so arranged that the operation is completely automatic so that the instrument can operate for any desired length of time, unattended. During this time the appearance of fractions are recorded on a recorder in the form of a tracing and the fractions collected in different containers.

Generally speaking, the present invention contemplates an instrument for preparative gel electrophoresis. The heart of the instrument is a curvilinear cylindrical elongated separation zone which is defined by outer and inner hollow components. The outer component forms a housing and includes an outer jacket with an inner wall spaced from said jacket to form an outer cooling zone therein-between. The inner component is axially aligned with said inner wall and slightly spaced therefrom. The inner component is likewise hollow and forms an inner cooling chamber. First and second buffer tanks are coupled to one and the other end of the separation zone. There are first and second electrodes and leads therefrom in said first and second buffer tanks, and outlet means are coupled to the one and the other end of said zone. To maintain the separation zone in the vertical position, support means are provided. With this instrument, a gel is enclosed in the separation zone while a sample to be separated is deposited in the gel. The buffer solution is then passed from the buffer tanks through the separation zone to the outlet means while D-C current is passed through the zone across the buffer liquid and gel between the electrodes. The instrument is kept at a constant temperature by means of a cooling fluid passed through the outer and inner cooling zones.

The invention as well as other objects and advantages will become apparent from the following description taken in conjunction with the accompanying drawing in which:

FIGURE 1 is a perspective view of one of the instruments contemplated herein;

FIGURE 2 shows a cross sectional view of constant liquid levelling means used herein;

FIGURE 3 is a perspective view of one of the components used in the instrument of FIGURE 1;

FIGURE 4 illustrates a tool useful with the present invention;

FIGURE 6 illustrates another arrangement useful with the instrument shown in FIGURE 1; and, FIGURE 7 illustrates another instrument contemplated herein.

Figure 1A:
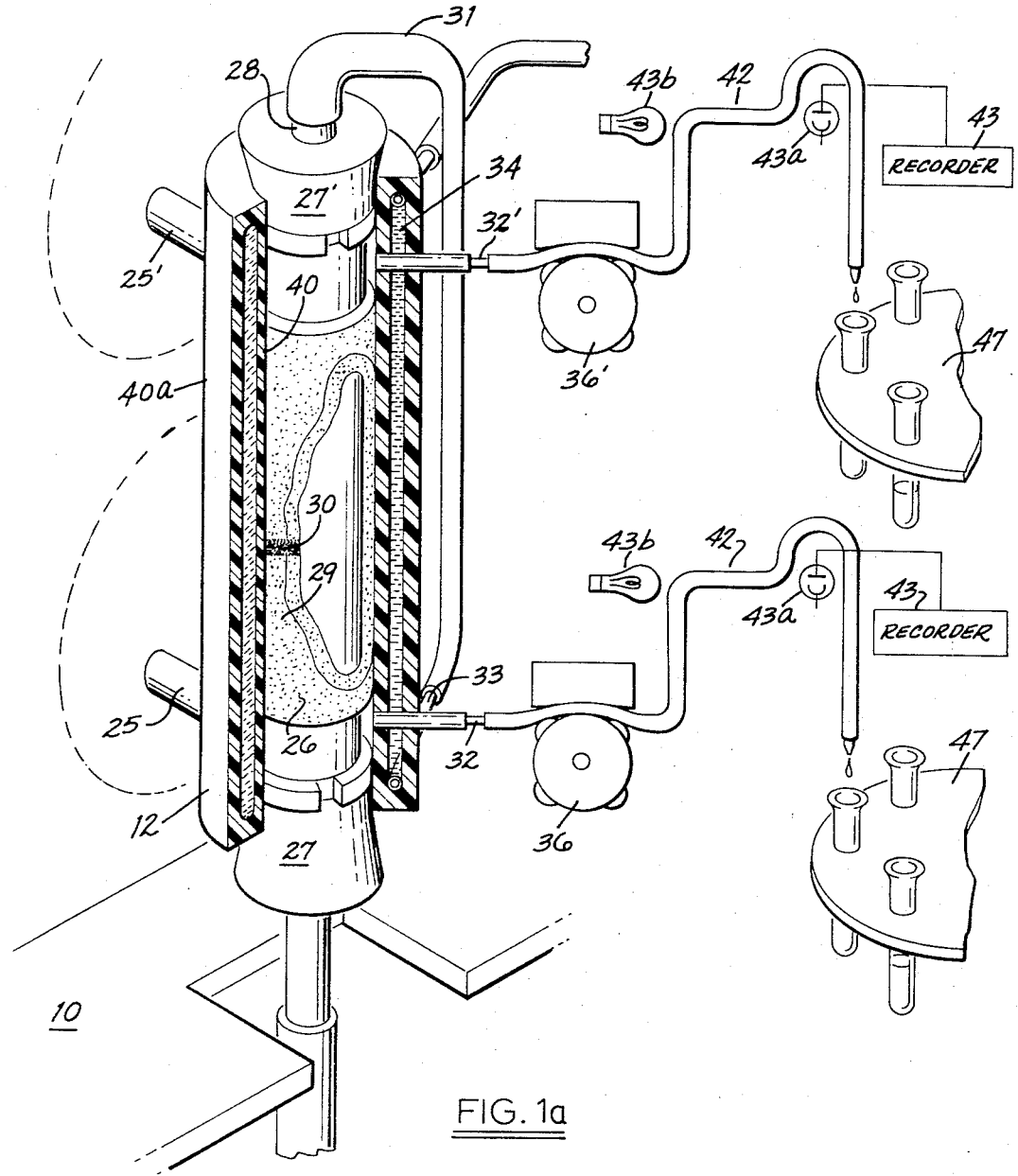
FIGURE 1a is an enlarged view of the right hand side of FIGURE 1.
Figure 5:
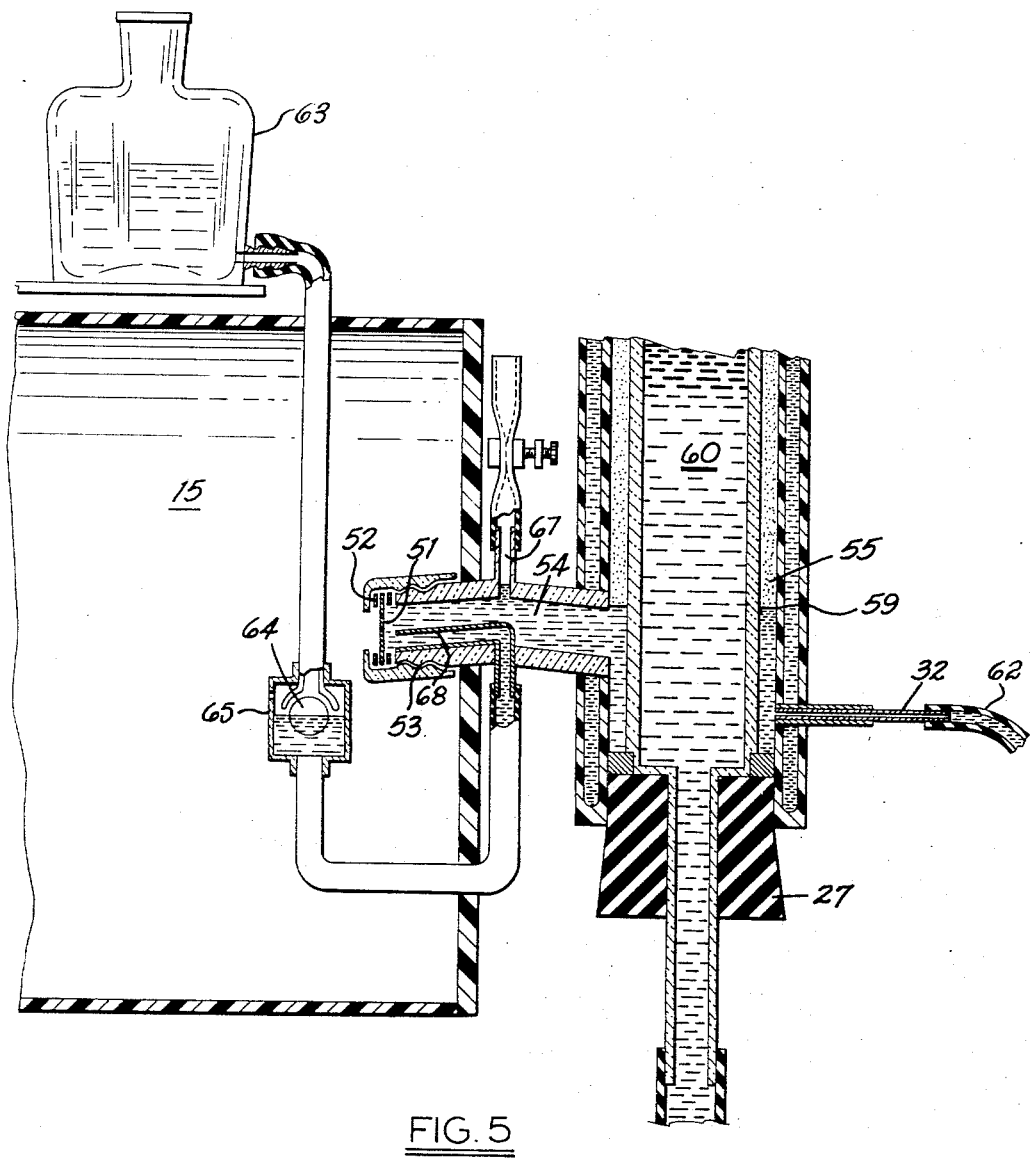
FIGURE 5 depicts an arrangement useful with the instrument shown in FIGURE 1.

As shown in FIGURE 1, the instrument rests on a supporting base 10 fitted with leveling screws 11, which serve to adjust the orientation of a hollow curvilinear cylindrical housing 12 to an accurately vertical position. This housing forms the outer component of the separation zone which is the heart of the instrument. Vertical plastic supports 13, 14 serve to support two buffer tanks 15, 15' and the housing 12.

These supports also act as end walls of the buffer tanks 15, 15'. The tanks are emptied by exhaust ports 16, 16'. These ports are connected to hoses 17, 17' which may be closed with the screw clamps 17a, 17a. Two large reservoirs (not shown) are connected to the buffer tanks by hose connectors 18, 18'. Constant levelling devices 19, 19' maintain the buffer at constant level in the buffer tanks. These tanks are supplied with covers 20, 20' with exit holes 21, 21' for release of gases of electrolysis. Electrical plugs 22, 22' are supplied so that the connecting wires to the D.C. power supply by electrical leads 24 may be unplugged and reversed if so desired. The electrodes 23, 23 are made of platinum wire. Short plastic connecting tubes 25, 25' connect the buffer tanks to the center of the separation zone so that buffer will be continuously supplied to the gel to make electrical contact. These tubes are sealed on their outside to both the inner and outer components defining the separation zone, and are disposed at an angle so that gases will move back to the buffer tank and not over or under the gel to avoid breaking of electrical contact.

Within the housing 12 is a hollow plastic inner tube 26 supplied for the passage of cooling fluid. This inner tube 26 forms the inner component of the separation zone. Rubber stoppers 27, 27' with a hole in the center act as seals to retain the buffer in the separation zone. Cooling fluid flows through the inner tube 26, exits from plastic port 28 and flows through connecting hose 31, then into the outer cooling zone entrance port 33 inside the outer cooling zone 34 formed by the housing outer jacket 40a and a thin inner wall 40, and finally out through housing jacket exit 35. It is within this space between inner tube 26 and the inner wall 40 of the housing, cooled from both sides and forming the separation zone, that there is deposited a gel 29 used in the preparative electrophoretic gel separation. The sample 30 is embedded in soft gel before the electrophoresis is started and placed in the center of the separation zone. Capillary exit ports 32, 32' are provided which communicate with the separation zone formed by the housing and inner tube. These are sealed from the outside of the tube to the inner and outer components forming the separation zone. Peristaltic pumps 36, 36' carry the buffer away from the space below and above the gel. Thus the buffer from the tanks moves to the space below and above the gel and washes the fractions away as they emerge from the column of gel. This buffer moves through a flow cuvette 42 which is part of a spectophotometer so that the presence of protein fractions may be indicated on a recorder 43 after receiving a signal from a phototube 43a activated by ultraviolet rays which passes through the flow cuvette from an ultraviolet source 43b.

After the solution passes through the flow cuvette the fractions are deposited in test tube containers rotatably supported on a turntable 47 which changes test tubes sequentially at timed intervals.

The inner tube i.e. inner component is shown separately in the drawing. Entrance and exit tubes 38, 38' for the cooling fluid are provided at both ends. Two removable spacers 39, 39' serve to center the inner tube within the housing so as to provide a gel of even thickness. The inner tube is slightly countersunk at both ends so that the spacers can slip on but cannot go beyond the edge of the inner tube. Space is provided to permit the adding of the sample by means of a catheter.

The housing has a thin inner wall 40 of the order of 1/16 inch to allow cooling. This wall may be knurled on the outside to prevent slippage of the gel. A support 41 for the gel may be used. This support if used is of flexible material which holds tight to the inner tube and of a thickness to press on the inner wall 40 of the housing. This support should be porous and may be made of cellulose or rubber sponge, nylon cloth, porous Teflon or polyethylene, filter paper or cotton cloth.

The gel may be formed without a support using a gel forming support 42 shown in FIGURE 4. This gel forming support 42 is made of rigid plastic or molded rubber of a wall thickness less than the space between the inner tube and the inner wall 40 of the housing. A flexible sleeve 45 e.g. rubber is folded inside and outside of one end of the rigid tube so as to form a seal between the inner tube and inner wall of the housing. Preferably, this flexible tube has a V-shaped top 44 so that the gel when formed will have a V shape at its lower end.

In FIGURE 1, the flow of buffer washing the polypeptides coming off the gel into the test tubes comes from the buffer tanks. Since there is a tendency for the proteins to move toward the electrodes in the buffer chambers, the flow rate of buffer liquid must be of an order to overcome this tendency. Thus, for a gel cylinder of one inch bore and of 4 millimeters thickness, a convenient flow is of the order of 1 to 3 millimeters per minute. On the other hand, since the concentration of polypeptide coming off the gel in the buffer is a function of the buffer flow it is highly desirable that this flow be as low as possible so that the lesser fractions may be detected in the flow cuvette spectrophotometer arrangement. To achieve this some variations of the apparatus just described may be employed. In one variation, the protein or polypeptide is prevented from moving toward the electrodes by a semi-permeable barrier which does not allow them to pass. Flow of buffer is from an outside source. In this case, the connecting tubes to the buffer tanks, are peaked so as to allow air to be removed.

The semi-permeable membrane 51 e.g. cellophane or cellulose acetate is maintained by a gasket 52 which is held tightly in place by a screw cap 53 so as to avoid leakage. The electric current, water and electrolytes can pass through the membrane between the buffer tank 15 and buffer solution 54 contacting the gel 55. The entrance port for the cooling fluid to the inner tube and the rubber stopper 27 to hold the inner tube are shown for comparison with the first embodiment. Electric contact 59 is made at the interface of gel and buffer. The cooling fluid 60 is in the inner tube. The capillary exit tube 32 for collecting the fractions eluted from the gel is connected to plastic tubing 62 leading to a peristaltic pump. A large buffer reservoir 63 is connected to a constant leveling device 64 in a small reservoir 65 so as to maintain a constant pressure on both sides of the cellophane. The buffer level in the small reservoir 65 is kept at about the same height as in the buffer tank so that the pressure on both sides of the cellophane is about the same. This also serves to maintain a constant head pressure so that a constant flow is readily maintained.

The hose connection from the small reservoir 65 is made to the plastic tubing connecting the tank to the space under the gel. In order to expel air which may collect at the bottom of the gel when first loading the instrument an air exit port 67 is provided. With this port open, tilting of the whole apparatus causes the air to flow out of this port and be replaced by buffer. The air exit port is then closed with a screw clamp on a hose connected to it. In this arrangement buffer flows from the small reservoir and out of the capillary exit. Tube 68 is disposed so that the incoming buffer continually washes away any polypeptides collecting at the surface of the membrane. This latter extension tube may be bypassed by the alternative arrangement shown in FIGURE 6 of the drawing. In this set-up the cellophane is fixed on a nipple 69 and inserted in the plastic tube connecting the buffer to the elution area in such a way that incoming eluting buffer washes the surface of the cellophane directly. In this case the connecting tube need not be peaked for air release. The membrane 51 is held in place on the threaded nipple 69 by the threaded cap 71 with the aid of the gasket 72. A hose 73 leads to buffer tank tube 15. The assembly of membrane, nipple and screw cap is held in place in the connecting tube by means of an O-ring 74. An air exit port 75 to allow trapped air to escape is provided in the plastic connecting tubes 25a.

When using the instrument, the gel will be deposited in the separation zone between the inner tube and the housing inner wall. This distance may be varied advantageously from 1 to 5 mm. depending upon the outer dimension of the inner tube used. In practice a distance of 3 mm. is preferable. A gel will be formed therefore in the form of a hollow cylinder with the cylindrical walls of the gel being of the order of 3 mm. in thickness. The diameter of the base of the cylinder of gel may be varied according to the capacity desired by adjusting the bore of the separator housing and the inner tube. In one variation the inner tube has a diameter of one inch and the inner wall of the housing has a diameter of 1¼ inches. Thus in this case the thickness of the gel was ⅛ inch or 3.2 mm. approximately. For this instrument, a gel length of 7 inches (175 mm. approximately) is used. Such an instrument will conveniently process and separate the individual components of 50 mg. of polypeptides. For a higher capacity, gels of 5 mm. thickness have been used with the gel cylinder being 2 inches in diameter and 12 inches in length. Such a gel will conveniently process 300 mg. of polypeptide.

In order to prepare the gel cylinder support the inner cylinder is removed and an elastic porous band of inert material such as cotton or porous polyethylene or Teflon is slipped in place. The instrument is assembled connecting the bottom seal. The porous band is now just above the lower entrance tube. By means of a syringe and a fine polyethylene catheter tube 0.5 ml. of gel solution is applied to the band. This gels and now acts as a seal. Gel solution is now added halfway up the space between the inner tube and the inner wall and this is allowed to harden. The material to be processed is now dissolved in 0.5 of the gel solution diluted fourfold with buffer and this is now deposited on top of the gel. This hardens and the specimen keeps in the gel. Finally gel solution is added up to and just below the upper exit tube.

Thus the sample is in the middle, with gel above and below it. The upper seal is now used. The entrance and exit tubes are sealed with a clamp and buffer is allowed to flow into the buffer tanks until at constant level. The instrument is tilted to allow trapped air above and below the gel to escape through the buffer tanks by floating upward. The instrument is then returned to its original position and the electrical flow is started.

The flow of buffer solution can now be started to the flow cuvette and the test tubes are moved by the turntable. Generally, with polypeptides, the samples do not exist from the gel in less than an hour, thus one can allow the current to flow for one hour and then start the flow of buffer to the turntable.

Since in some instances, even a band of inert material as a support is undesirable, it is also possible to use the instrument without such a band. To do this, the lower spacer and rubber stopper is removed. Hose connections to the entrance and exit tubes are also removed. The upper spacer can be held in place by hand. Special gel forming support 42 is then inserted so as to form a seal in the separation zone between the inner tube and the inner wall of the housing at a position just above lower plastic connecting tube 25. The inner tube is now held in the desired position by the tight fitting gel forming support. Gel solution is now added by means of a syringe and polyethylene catheter by sliding the catheter down through the open space in the spacer. When gel is so formed, it is allowed to harden. The upper rubber stopper is now replaced holding the inner tube in place. The gel forming support is turned to free it from the gel and then slid out. The lower spacer and stopper are replaced and the gel is now rigidly held. The upper stopper may then again be removed if sample is to be added or more gel solution is to be poured. In this case, gel slippage can be prevented by having the inner tube knurled. In setting up the instrument, it is essential that the separation zone be vertically disposed. To this end, before inserting the inner tube it is best to drop a plumb line through the housing and adjust the leveling screws 11. This insures that the various fractions leave the gel like smoke puff rings parallel to the horizontal.

The instrument just described has the buffer tanks 15, 15′ separated from the separation zone. This arrangement will work only if the separation zone is sufficiently thin. While the electrodes must be kept out of the separation zone to prevent the products of the electrolysis from participating in the electrophoretic process, it must be remembered that the materials in the separation zone form an electrical resistance and the conductance therethrough varies with the cross-sectional area of the zone. By thinning the separation zone, more power is required which is often undesirable but this forces the current to pass more evenly through the zone around the cylinder. At the same time, the passage of the D-C current through this zone is subject to the general rules of flowing current such as Ohm's law, Kirchoff's law and the Narcissis effect. Although these laws and effects are individually well known, the combination of these in the separation zone can produce some undesirable effects. Generally, with the separation zone sufficiently thin, the flowing current will be fairly evenly distributed throughout the zone and minor variations can be disregarded. As the cross sectional area of the zone increases, the current, in the absence of other factors tends to travel the shortest distance between the two electrodes. Thus the activity on the side nearer the electrodes is greater than on the far side.

Figure 7:
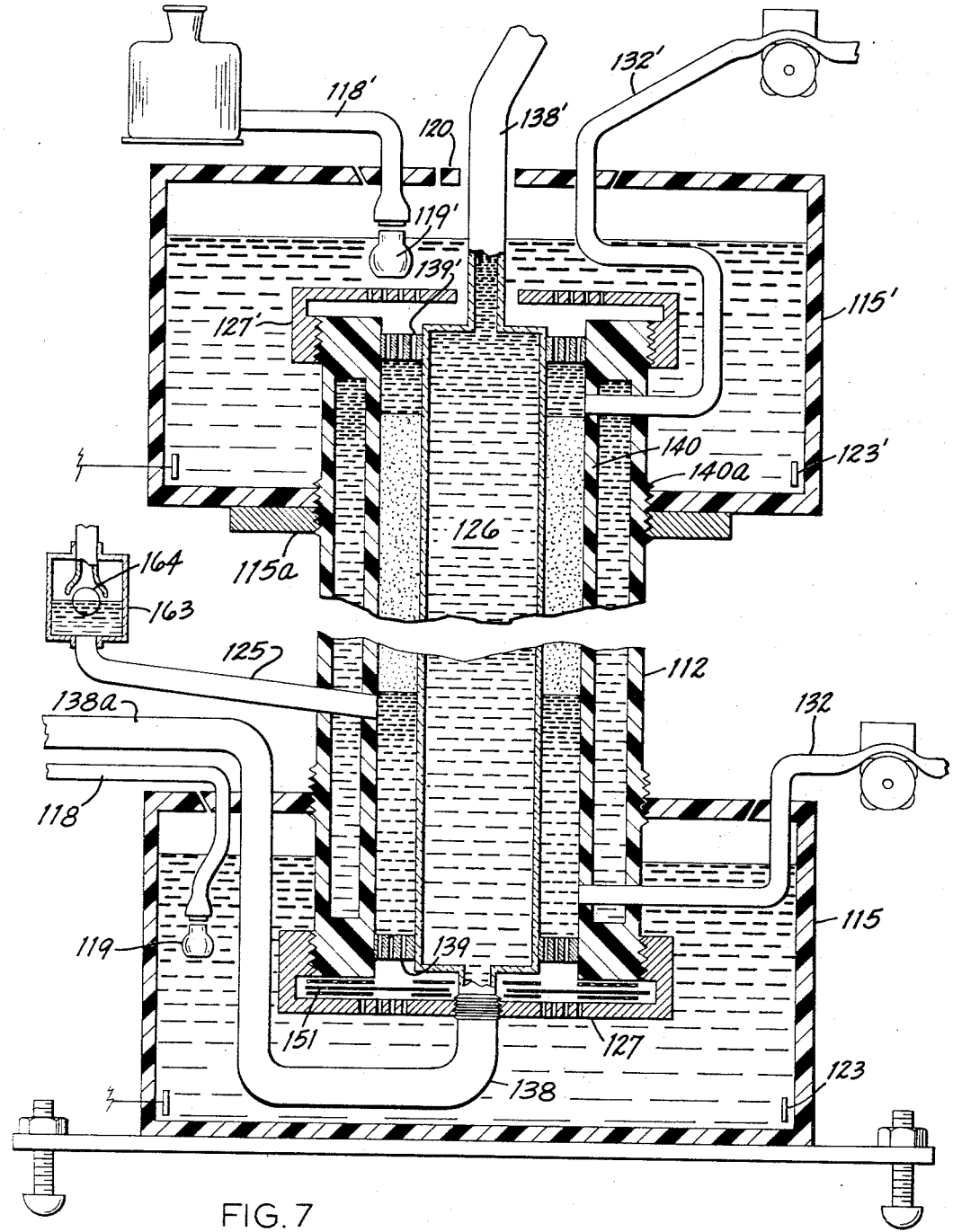

Because of the complications caused by a plurality of electrical effects in the zone hereinabove mentioned, it is best to have a circular electrode feeding electricity evenly to all parts of the buffer at the top and bottom of the zone. Such an instrument is shown in FIGURE 7. This is accomplished by having the buffer tanks 115, 115' at the top and bottom of the separation zone. Housing 112 of this arrangement has a threaded outer jacket 140a, it need not be threaded from top to bottom but only at certain required locations. At the top and bottom of inner tube 126 spacers 139, 139' are located. Directly above the top spacer and under the bottom spacer is a porous membrane 151. This membrane permits the passage of electrical current from the buffer tanks to the gel. For some separations a membrane in the top tank is not needed. Usually, this membrane is of cellophane. Below the lower membrane and above the upper membrane (if used) are perforated screw tops 127, 127' fastened to outer jacket 140a holding the inner tube 126 and the memberanes 151, 151' firmly in place. Openings are provided for the passage of entrance and exit tubes 138, 138'. When the perforated screw caps are tightened, a water tight seal is made with the aid of polyethylene gaskets (not shown). The setting of the upper and lower tanks 115, 115' differs somewhat, the lower tank can have a threaded cover 120 and the lower tank 115 is held to its cover. Openings are provided in the lower cover for the escape of gases and for the passage of cooling water hose 138a and buffer supply hose 118. The tank includes constant levelling device 119, in the line of hose 118. The upper buffer tank 115' is threaded directly to the upper part of the jacket 140a and includes a threaded sealing member 115a to make a water tight seal. The upper tank 115' also has a top 120' having openings to permit the escape of gas, and allow the buffer supply line 118' to enter. This tank also includes constant liquid level means 119'. The electrodes 123, 123' in both tanks are circular extending all the way around the tank and are fed by lines 122, 122'. From the top buffer tank, fluid washes directly out to capillary exit port 132' below the buffer level. For the lower capillary port 132, an additional source of buffer 163 with constant liquid leveling means 164 therein having a plastic connecting tube 125 serves to wash buffer to the capillary exit port 132. Cooling fluid is circulated through the inner tube 126 as well as the space between inner wall 140 and outer jacket 140a in a manner similar to what has been described via connecting hose 138, 138'. Also support means similar to those shown in FIGURE 1 are needed to maintain the vertical orientation of the separation zone. With the buffer tanks above and below the separation zone and with electrodes substantially equidistant from the zone, the materials in the zone will separate evenly and clearly along the separation zone.

It is to be observed therefore that the present invention provides for an instrument for preparative gel electrophoresis, comprising in combination, an elongated hollow curvilinear e.g., right cylindrical separation zone defined by outer and inner hollow components, the outer component forming a housing including an outer jacket with an inner wall spaced from said jacket to form an outer cooling zone thereinbetween, the inner component being a hollow plastic inner tube axially aligned with said inner wall and slightly spaced therefrom, said inner component being hollow and forming an inner cooling chamber, first and second buffer tanks coupled to one and the other end of said separation zone; first and second electrodes and leads from said first and second buffer tanks; support means for maintaining said separation zone in the vertical position; and capillary outlet means, coupled to the one and the other end of said separation zone.

The buffer tanks are either fitted directly above and below the separation zone or are coupled to the separation zone by short plastic tubes angularly disposed downwards in the direction of the separation zone. An air exit port to allow trapped air to escape may be provided therein. The flow of buffer through the separation zone is regulated from the buffer tanks by constant leveling devices. Since there is a tendency for the substances separated to move towards the electrodes located in the buffer tanks, the separated substances must be washed out into the capillary outlet means. This may be accomplished either by increasing the flow rate of the buffer solution, or by interposing a semipermeable barrier between the separation zone and the buffer tank. To equalize the pressure on the membrane, an auxiliary small reservoir is provided with buffer solution and an elbow extension tube is so disposed in the flow line from the small reservoir that buffer liquid will wash up against the membrane and out towards the capillary outlet means.

Furthermore, it will be observed that the components forming the separation although shown in the drawing as right circular cylinders need not be of circular cross-section but can be oval as long as no lateral edges are formed. It is important however that the separation zone remain vertical so that the fractions move downwards or upwards at the same speed.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:
1. An instrument for preparative gel electrophoresis, comprising in combination;
   an elongated hollow curvilinear separation zone defined by outer and inner hollow components, the outer component forming a zone housing including an outer jacket with a inner wall spaced from said jacket to form an outer cooling zone thereinbetween, the inner component being axially aligned with said inner wall and slightly spaced therefrom, said inner component being hollow forming an inner cooling chamber;
   first and second buffer tanks coupled to one and the other end of said zone;
   first and second electrodes and electrical leads from said first and second buffer tanks;
   support means for maintaining said zone in the vertical position; and
   outlet means coupled to the one and the other end of said zone.

2. An instrument as claimed in claim 1, said buffer tanks being disposed above and below said separation zone and directly coupled thereto.

3. An instrument as claimed in claim 1, said buffer tanks being coupled to said zone by short connecting tubes.

4. An instrument as claimed in claim 3, said electrodes being disposed in said buffer tanks in the vicinity of said short connecting tubes.

5. An instrument as claimed in claim 1, said defined separation zone being a right circular cylinder.

6. A device as claimed in claim 1 including liquid level control means in said buffer tanks.

7. A device as claimed in claim 1, said inner component including spacing means to axially align said component with said inner wall.

8. A device as claimed in claim 1 including a semipermeable membrane interposed between said buffer tanks and said separation zone.

9. A device as claimed in claim 8, including a reservoir supplying buffer, said reservoir including liquid level control means to maintain constant pressure and thus constant flow.

10. A device as claimed in claim 9 including short connecting tubes between said buffer tanks and said separation zone, tube means disposed between said reservoir and said connecting tubes to wash buffer liquid against said membrane.

11. A device as claimed in claim 1 including a removable gel support device for maintaining the inner tube in a fixed position relative to the inner wall so that material may be poured to form a gel between said inner component and inner wall.

12. An instrument for preparative gel electrophoresis, comprising in combination;
- an elongated hollow cylindrical separation zone defined by outer and inner components, the outer component forming a zone housing including an outer jacket with an inner wall spaced from said jacket to form an outer cooling zone therebetween, the inner component being axially aligned with said inner wall and spaced therefrom, said inner component being hollow forming an inner cooling chamber, said zone being designed to hold a gel therein;
- a first buffer tank coupled under the lower end of said housing designed to contain a buffer liquid, a circular electrode in said first buffer tank with electrical leads placed so as to evenly pass electricity through said zone;
- membrane holding means between said first buffer tank and said zone to hold a membrane therebetween preventing movement of proteins to the electrodes before they are washed out to the collecting tubes;
- a second buffer tank coupled over the upper end of said housing likewise designed to contain the buffer liquid, a circular electrode in said second buffer tank with electrical leads likewise placed so as to evenly pass electricity through said zone;
- upper and lower outlet means coupled to one and the other end of said zone;
- a reservoir coupled to the zone towards said lower outlet means to wash buffer liquid through the lower portion of said zone; and
- support means to maintain said zone in the vertical position.

References Cited

UNITED STATES PATENTS

| | | | |
|---|---|---|---|
| 3,129,158 | 4/1964 | Raymond et al. | 204—180 |
| 3,208,929 | 9/1965 | Raymond et al. | 204—299 |
| 3,326,790 | 6/1967 | Bergrahm | 204—180 |

JOHN H. MACK, *Primary Examiner.*

A. C. PRESCOTT, *Assistant Examiner.*